Dec. 31, 1935.  D. H. GOODWILLIE  2,026,165
PROCESS AND APPARATUS FOR PRODUCING CASE HARDENED GLASS
Filed Aug. 1, 1934   2 Sheets-Sheet 1
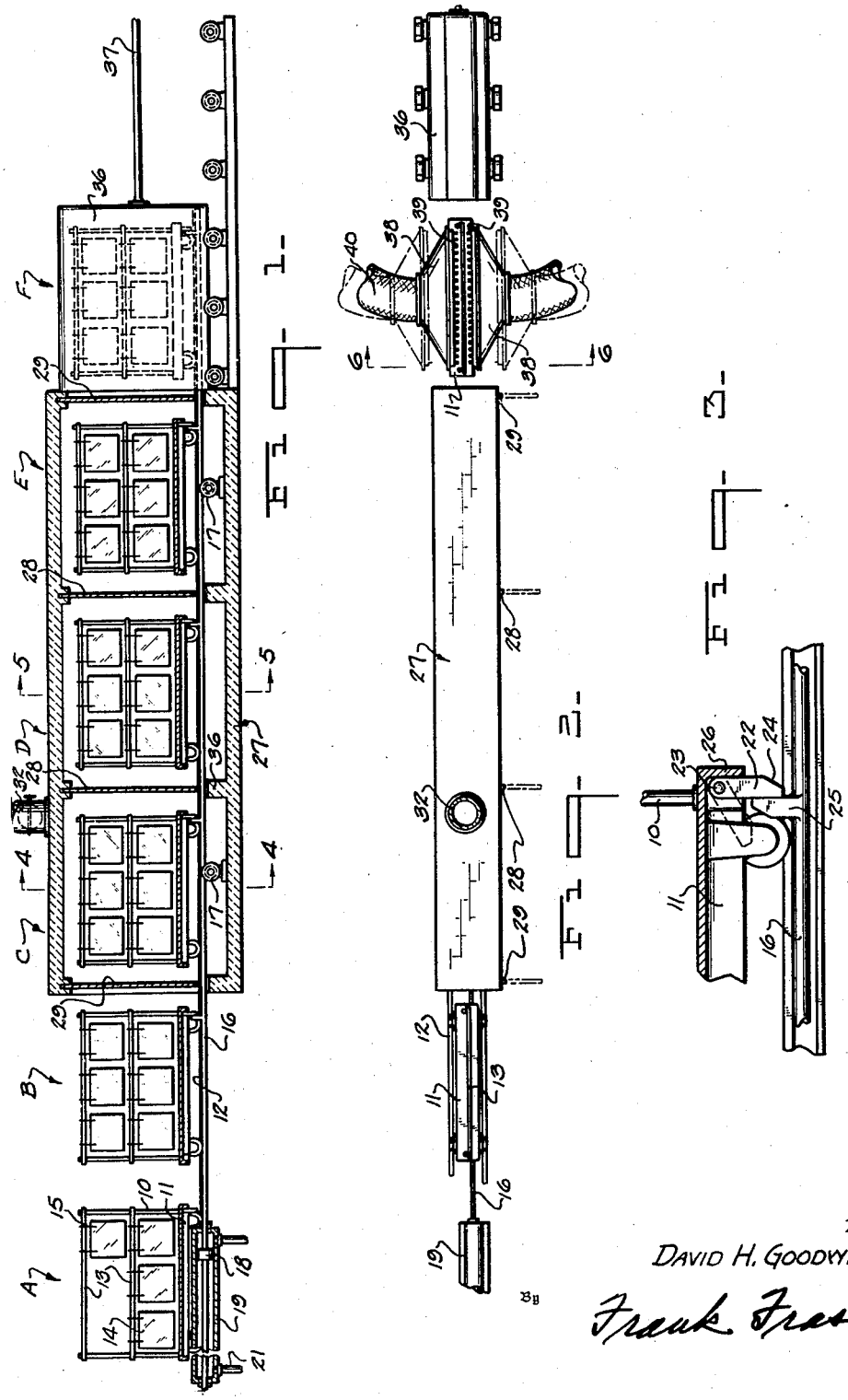
Inventor
DAVID H. GOODWILLIE.
By Frank Fraser
Attorney Dec. 31, 1935.  D. H. GOODWILLIE  2,026,165
PROCESS AND APPARATUS FOR PRODUCING CASE HARDENED GLASS
Filed Aug. 1, 1934  2 Sheets-Sheet 2
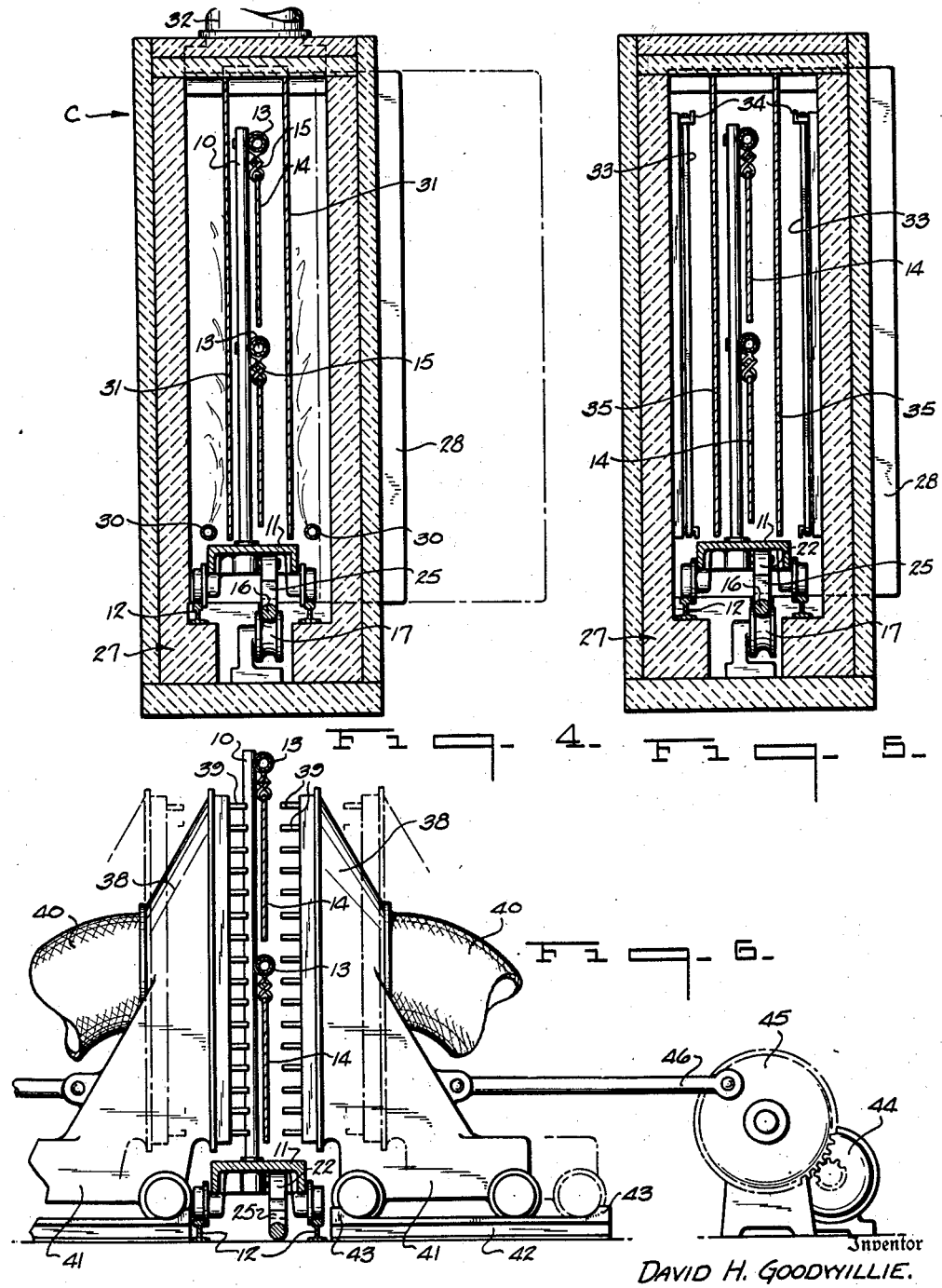
Inventor
DAVID H. GOODWILLIE.
By Frank Fraser
Attorney Patented Dec. 31, 1935

2,026,165

UNITED STATES PATENT OFFICE 2,026,165

PROCESS AND APPARATUS FOR PRODUCING CASE HARDENED GLASS

David H. Goodwillie, Toledo, Ohio, assignor to Libbey-Owens-Ford Glass Company, Toledo, Ohio, a corporation of Ohio Application August 1, 1934, Serial No. 737,893

9 Claims. (Cl. 49—45)

The present invention relates to a process and apparatus for producing case hardened glass, and more particularly to that type wherein the glass sheet is heated to approximately its point of softening and then rapidly chilled to place the outer surfaces thereof under compression and the interior of the sheet under tension.

The treatment of glass sheets in this way materially increases the mechanical strength of the glass and also changes the breaking characteristics thereof in that when broken it will disintegrate into innumerable fragments, each small, instead of breaking into large pieces as in the case of ordinary glass sheets. Therefore, in addition to the greatly increased mechanical strength of the treated glass, such glass has utility as a form of safety glass because of the relatively harmless character of the disintegrated fragments produced when the glass is broken.

Because of the character of the case hardened glass, it is absolutely essential that the glass be accurately shaped and sized prior to treatment as the customary glass grinding, polishing, and cutting operations cannot be performed after the case hardening treatment without breakage of the glass.

Heretofore, the production of case hardened glass of this general type has been relatively costly not only because of the expense involved in the case hardening steps and necessity for custom building, but also because the heating and cooling of the glass has been extremely slow with small production being obtained from each unit. In fact, it has been the practice to case harden a single sheet of glass at a time.

The present invention relates more particularly to a process and apparatus wherein many sheets may be simultaneously heated and then simultaneously cooled in a continuous type system with satisfactory results. It will of course be understood that manufacture of case hardened glass requires extreme care, delicate handling, and accurate control to get glass having predetermined breaking characteristics.

Broadly speaking, the system comprises a loading station where a number of sheets of glass may be arranged on a movable rack ready for the case hardening treatment. After loading of the rack, it is moved into waiting position ready for entrance into the furnace.

The furnace is preferably divided into a number of sections, the first of which may be heated by gas for sake of economy and in reality is a preheating chamber designed to elevate the temperature of the glass from room temperatures.

At the proper point in the cycle, the rack of glass so preheated is moved into the next succeeding chamber where the temperature is still further elevated. Electrical heating is preferably employed at this point and again at the proper time in the cycle, the rack of glass is advanced still further through the furnace and may go directly into the final heating compartment thereof.

Here the temperature of the glass sheets is carefully and accurately controlled to bring the glass to a temperature approximately at its point of softening. The glass is then rapidly removed from the furnace and during the removal thereof a temporary covering is preferably provided which may take the form of an envelope and when the glass is exteriorly of the furnace and in proper position for cooling of the opposite surfaces thereof, the envelope or other temporary covering may be quickly moved from about the glass and the cooling elements brought into operative association therewith to effect the necessary chilling of the surfaces.

By the use of such a system, it is possible to quickly and efficiently case harden glass in a commercial manner so that the cost of production is relatively less than heretofore and, further, quantity production is permitted with a minimum of apparatus which is in contra-distinction to the old system of heating one sheet of glass at a time in a furnace and then moving it between the cooling elements so that production is extremely slow and not particularly well adapted to large scale manufacturing operations.

In the drawings wherein like numerals are employed to designate like parts throughout the same, Fig. 1 is a vertical longitudinal section showing diagrammatically a form of furnace and associated parts that may be used, Fig. 2 is a plan view thereof, Fig. 3 is an enlarged detail showing a form of mechanism that may be used for propelling the racks of glass, Fig. 4 is a vertical transverse section taken on line 4—4 in Fig. 1, Fig. 5 is a similar section taken on line 5—5 of Fig. 1, and Fig. 6 is a transverse view taken on line 6—6 in Fig. 2.

As has already been stated, the glass before the case hardening treatment must be cut to the desired shape and size and any edge work desired is also done before treatment. The glass sheets are then mounted on racks and in Fig. 1, the letter A designates the loading station. It will be noted that the rack 10 is arranged at the loading station and comprises the vertical members 10 carried by the truck 11 adapted to run on the track 12. Arranged between the vertical supports 10 are the transverse members 13 and as shown more clearly in Figs. 4, 5 and 6, the glass sheets 14 are suspended from the bars 13 by means of the tongs 15. The exact construction and operation of the tongs do not constitute a part of the present invention, and therefore it is sufficient to point out that the tongs are of such character that they will engage opposite sides of the glass sheets near their upper edges and properly support them during the case hardening operations.

After the glass has been loaded upon the rack, it is moved to the waiting position B. Movement of the racks of glass may be accomplished by means of the horizontally disposed rod 16 supported at spaced points on the grooved rollers 17 and operable by means of the piston 18 operating within the cylinder 19. Conduits 20 and 21 are provided to effect movement of the plunger, and by use of the means shown it is possible to start and stop the racks of glass without undue jolting or jarring thereof. This is important especially after the glass sheets have been heated to their point of softening as it is not desired to warp or otherwise spoil the planity of the glass sheets during the case hardening treatment especially as it is impossible to correct warpage or other defects after the case hardening treatment has been completed.

In Fig. 3 is shown a detail wherein it will be noted that each rack of glass carries the depending arm 22 pivoted to the track by means of the pin 23 and provided with the beveled face 24. The rod 16 carries the spaced upstanding pins 25 which, when moved from left to right, engage the depending arm 22 which in turn bears against the end 26 of the rack causing movement thereof.

When the plunger is retracted, the upstanding fingers are free to pass the arms 22 without interfering with the position of the racks because the arm is pivoted and will swing freely to a position such as is shown in dotted lines.

It will be noted that the furnace 27, in the particular illustration made, is divided into the three compartments C, D and E by means of the movable partitions 28, although a greater number of compartments can be used if desired. Similar partitions 29 are provided at each end of the furnace to permit ingress and egress of the racks of glass with respect to the furnace.

As shown in Fig. 4, the compartment C is provided with the gas burners 30 adapted to control the temperature of the glass within this particular compartment. It is preferred that the baffles 31 be used, so that the compartment embodies muffled heating rather than direct heating.

Incidentally, it may be said that the number of sheets of glass carried by each rack will not only depend upon the size of glass sheets to be treated but also on the size of the entire equipment. In the particular illustration made, two rows of glass sheets are carried on each rack so that a multiple of glass sheets are treated simultaneously.

Due to the use of gas heating in compartment C, a controllable stack 32 is associated with the top thereof.

As the chamber C is employed as a sort of preheating chamber, namely, to elevate the temperature of the glass from room temperature, the glass may be heated to a point somewhat below that ultimately reached in the final heating compartment and, by way of example, it is mentioned that the temperature in this first or preheating compartment may be such as to raise the temperature of the glass to about 500° F.

At the proper point in the cycle, all of the partitions, namely, the partitions 28 within the furnace and the partitions 29 at the ends of the furnace are moved out of their normally closed position to an open position which is indicated in Figs. 2 and 4 by the dotted lines. The plunger is then operated to advance all of the racks of glass forwardly one step. The partitions are again closed as promptly as possible and the rack that was stationed at the loading station is advanced to the waiting station while in turn that rack which was at the waiting station has been introduced into compartment C of the furnace. Also the rack of glass that was in the compartment C has now been advanced to the second compartment, namely, compartment D.

Compartment D is similar to compartment C except that it is preferred to employ electrical heating and to further elevate the temperature of the glass to a temperature, for example, of approximately 900° F. Ordinary resistors 33 supported on the insulators 34 and controlled through any suitable and well known devices can be used. As in the case of the gas heating, the baffles 35 can be arranged within the compartment spaced sufficiently far apart to permit unobstructed passage of the racks of glass through the tunnel and such as to give muffled heating.

It will also be noted that the permanent partitions 36 are fixed in vertical alignment with the movable partitions 28 and 29 so that the compartments are practically completely separated from one another except for the short time that it takes to transfer a rack of glass to the next succeeding compartment.

While any number of heating compartments can be used, for purposes of illustration only three have been shown in the drawings, namely, the preheating chamber, the intermediate chamber, and the final heating chamber. The final heating chamber is designated by the letter E, the glass being transferred thereto by means of the longitudinally operable rod 16. In the compartment E, electrical heating is also employed and the temperature of the glass is raised to approximately the point of softening which ordinarily is about 1250° F. It is important that each sheet of glass be heated substantially uniform throughout its entire area, so that the glass is left in compartment E a sufficient length of time to accomplish this uniform heating.

The glass is now ready to be rapidly chilled so that the partitions are again moved from their closed position, the plunger and rod operated to advance each rack of glass forward one step, and, as shown in Fig. 1, the rack of glass is moved from within the compartment E. To prevent improper cooling of the glass, the rack of glass is received within a temporary covering or envelope 36 which can be operated longitudinally of the tank by means of the plunger 37 or other operating devices. At the moment the rack of glass is to be removed from the compartment E, the compartment is placed in alignment with the opening formed when the partition 29 is moved out of closed position, so that the rack is received in the position illustrated in dotted lines in Fig. 1.

In Figs. 2 and 6 are shown the cooling devices designed to rapidly chill the opposed surfaces of the uniformly heated glass sheets. The heating devices comprise the cooling heads 38 which, in accordance with my invention, are adapted to be moved toward and away from one another. Each head is provided with a plurality of spaced nipples 39 through which air may be blown at any desired pressure, the air being received through the flexible hose connections 40.

When the rack of glass is to be removed from the compartment E, the cooling heads are spaced apart in the positions illustrated in dotted lines in Figs. 2 and 6. When the rack of glass has been pushed exteriorly of the furnace, the envelope 36 is quickly withdrawn and the cooling heads are moved together to the positions shown in full lines in Figs. 2 and 6. Air blasts are then directed upon the opposite surfaces of the glass sheets in a manner to very quickly cool them which places the exterior surfaces of the glass under compression and the interior thereof under tension. Incidentally, the cooling heads may be either held in a stationary position during this rapid chilling of the glass or they can be rotated or otherwise moved in the same plane as the faces of the glass sheets to accomplish the desired cooling and to control the pattern of breaking of the case hardened glass. After the chilling has been completed, the cooling heads can be again separated, the envelope 36 moved back to the exit end of the furnace and the operation continued as just described.

The movement of the cooling heads to and from operative position can be effected by mounting said heads on the trucks 41 movable on the tracks 42 mounted transversely of the direction of movement of the trucks of glass. The tracks can be shaped at their ends to produce the stops 43 to limit movement of the heads in both directions. An operating motor 44 geared to the wheel 45, which in turn is connected to the pitman 46, is shown as one way of positively and quickly placing the cooling heads into and out of operative position.

With the apparatus shown and described, it is possible to simultaneously case harden a plurality of glass sheets in a highly satisfactory manner. It is obvious that as one batch of glass sheets is being cooled, other batches are in varying stages of preparation for cooling, thus giving a substantially continuous system for producing what has been heretofore produced in a very slow and expensive way.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for use in the case hardening of glass sheets comprising means for heating a plurality of glass sheets simultaneously, means for moving said sheets from the heating means when the glass sheets have been heated to approximately their point of softening, a movable envelope for receiving the sheets removed from the heating means, cooling means positioned on both sides of the envelope, and means for removing the envelope so that the cooling means can be effective upon the glass sheets to suddenly chill them.

2. Apparatus for use in the case hardening of glass sheets comprising a furnace, means associated with the furnace for heating the glass sheets to approximately their point of softening, a movable envelope positioned at the exit end of the furnace, means for moving said envelope into glass receiving position at the exit end of the leer and for withdrawing said envelope from said position when desired, and cooling devices also arranged near the exit end of the furnace and on opposite sides of the envelope when in sheet receiving position, the envelope being moved into close proximity with the exit end of the furnace as the glass is withdrawn therefrom and in a position remote to said sheet receiving position when said cooling devices are used to chill the heated glass sheets.

3. Apparatus for use in the case hardening of glass sheets comprising a furnace, means associated with the furnace for heating the glass sheets to approximately their point of softening, a movable envelope positioned at the exit end of the furnace, means for moving said envelope into glass receiving position at the exit end of the leer and for withdrawing said envelope from said position when desired, cooling devices also arranged near the exit end of the furnace and on opposite sides of the envelope when in sheet receiving position, and means for moving the cooling devices laterally away from one another when the envelope is to be moved into sheet receiving position and for moving said cooling devices toward one another after the envelope has been removed from said position.

4. Apparatus for use in the case hardening of glass sheets comprising a plurality of heating compartments for elevating the temperature of a plurality of glass sheets simultaneously to approximately their point of softening, a movable envelope associated with the exit end of the furnace for protecting the glass sheets as they are removed from the furnace, and cooling devices for rapidly chilling the surfaces of the glass sheets after they have been removed from the furnace and the envelope removed from its protecting position.

5. Apparatus for use in the case hardening of glass sheets comprising a furnace including a plurality of compartments, means for moving a plurality of racks of glass through said furnace progressively through said compartments, means for heating the glass while in said compartments so that when leaving the final compartment the glass will be at approximately its point of softening, a movable envelope associated with the exit end of the furnace for protecting the glass sheets until they are in chilling position, and cooling devices for rapidly chilling the glass sheets after said envelope has been removed from its protecting position.

6. Apparatus for use in the case hardening of glass sheets comprising a furnace including a plurality of compartments, means for moving a plurality of racks of glass through said furnace progressively through said compartments, means for heating the glass while in said compartments so that when leaving the final compartment the glass will be at approximately its point of softening, a movable envelope associated with the exit end of the furnace for protecting the glass sheets until they are in chilling position, cooling devices for rapidly chilling the glass sheets after said envelope has been removed from its protecting position, and means for moving the chilling devices toward and away from the glass sheets.

7. Apparatus for use in the case hardening of glass sheets comprising a furnace including a plurality of compartments, means for heating the first compartment with a gaseous fuel, means for heating the final compartment electrically, means for advancing a rack supporting a plurality of sheets of glass simultaneously in a vertical position progressively from one compartment to the next and for removing one rack of glass at a time from the exit end of the furnace, a movable envelope associated with the exit end of the furnace for receiving the rack of glass as it issues from the furnace, means for withdrawing the envelope from about the rack of glass after it has been withdrawn from the furnace, and laterally movable cooling devices arranged exteriorly of the furnace for rapidly chilling the glass upon removal of the envelope therefrom.

8. The process of case hardening glass sheets consisting in passing the sheets through a furnace to heat them to approximately their point of softening, then passing the heated sheets from the furnace to within an envelope, then removing the envelope, and then chilling the opposite surfaces of said glass sheets.

9. The process of case hardening glass sheets consisting in passing a plurality of glass sheets suspended in vertical position simultaneously through an atmosphere of sufficient temperature to bring the glass sheets to approximately their point of softening, then moving the glass sheets from the heated atmosphere under a temporary covering, and then removing the temporary covering and rapidly chilling the surfaces of the glass sheets to place the outer surfaces thereof under compression and the interior of the sheets under tension.

DAVID H. GOODWILLIE.